3,410,837
RECOVERING ACRYLONITRILE POLYMERS
Takashi Shibukawa, Saidaiji, Japan, assignor to American Cyanamid Company, Stamford, Conn., a corporation of Maine
No Drawing. Filed Nov. 24, 1965, Ser. No. 509,638
Claims priority, application Japan, Nov. 28, 1964, 39/67,146
7 Claims. (Cl. 260—88.7)

ABSTRACT OF THE DISCLOSURE

In a method of recovering acrylonitrile polymer from an aqueous slurry thereof obtained upon polymerization of monomeric material comprising acrylonitrile in the presence of a redox catalyst system comprising a water-soluble reducing sulfoxy compound; the improvement comprising raising the pH of said slurry to between 4 and 6 prior to recovery of said monomers therefrom and then reducing the pH of a slurry of said polymer to about 4 and below.

---

This invention relates to improvements in a method of recovering unreacted monomers from the aqueous polymeric slurry obtainable upon polymerization of acrylonitrile or copolymerization of acrylonitrile with one or more vinyl monomers copolymerizable therewith in the presence of a redox polymerization catalyst comprising a water-soluble reducing sulfoxy compound.

It is well known to polymerize acrylonitrile alone or with other monomers in an aqueous medium in the presence of a redox polymerization catalyst comprising a water-soluble reducing sulfoxy compound. Water-soluble reducing sulfoxy compounds include sulfur dioxide, sulfites, bisulfites, metabisulfites, hydrosulfites, and thiosulfates. With such reducing sulfoxy compounds, redox catalyst systems using such oxidizers as hydrogen peroxide, persulfates, and chlorates are known and used as acrylonitrile polymerization catalysts. With such redox catalyst systems, acrylonitrile can be polymerized alone or with such other monomers as those disclosed in U.S. Patent 3,104,938, issued Sept. 24, 1963, and U.S. Patent 3,040,008, issued June 19, 1962, and in the various other United States patents mentioned therein.

In connection with the polymerization of acrylonitrile polymers in aqueous media, there have been proposed two methods for recovering the remaining unreacted monomers from the polymerization system, one of said methods comprising separating the polymer from the polymerization system by precipitation and filtration, and heating the filtrate to evaporate the unreacted monomer, and the other method comprising heating the polymeric slurry or blowing steam into said slurry without preliminarily separating the polymer, thereby evaporating or distilling off the unreacted monomer. Since, in the former method, a large volume of diluted liquid, i.e., a combined volume of the filtrate obtainable after separation of the polymer and the washing effluent, must be treated, the latter method is obviously more economical. The latter method, however, is not free from disadvantages, for the polymer also is heated so that it is likely to yellow or be degraded.

The present invention provides an improvement in such methods for recovering the unreacted monomers and the acrylonitrile polymer which comprises raising the pH of the aqueous slurry thereof to a pH of between 4 and 6 prior to recovering the unreacted monomers, thereby inactivating the unreacted sulfoxy compound, preventing further polymerization of the monomers, and then, either prior to or after recovery of such monomers, reducing the pH of the polymer slurry to about 4 and below, thereby improving the whiteness of the fibers obtained from such polymer.

In the polymerization reaction catalyzed by a redox catalyst system using a water-soluble reducing sulfoxy compound such as the chlorate ion-reducing sulfoxy ion system, the polymerization medium is preferably held below pH 3, for at any higher pH, there will be encountered abnormal rises in pH during the reaction, as well as the resultant increase in molecular weight and the corresponding reduction in the degree of polymerization. If this pH requirement is satisfied, the polymer slurry obtainable upon completion of the reaction will lie in the neighborhood of pH 1.5 to 3. However, there is abundant literature indicating that since polyacrylonitrile and acrylonitrile copolymers contain nitrile groups, they would be converted to polyacrylic acid or polyacrylamide upon saponification if an acid or alkali were present. Furthermore, it is known that the presence of COOH or $CONH_2$ groups that may arise upon saponification not only variegates the yarn-making quality of the fiber, but also alters its dye-receptivity. It is, therefore, of vital importance from the standpoint of product stability and uniformity to prevent degradation of the polymer as much as practicable. Acrylonitrile and monomers copolymerizable therewith, i.e. methyl acrylate, etc., just as their polymers, are also saponified in the presence of acids or alkalies. For example, the degree of hydrolysis (reaction temperature: 45° C.; reaction time: 1.5 hours) of the monomer is as follows.

| pH | Degree of hydrolysis of monomer, percent |
|---|---|
| 1.5 | 9 |
| 2 | 2 |
| 3β | 1 |
| 4–6 | (¹) |
| 7–10 | 30–60 |

¹ No appreciable reaction.

It will be apparent from the above table that, in order to prevent degradation of the polymer and, also, of the monomer in recovering the unreacted monomer from said polymeric slurry, it is necessary to adjust the slurry to a pH between 4 and 6.

Since substantial amounts of unreacted monomer and unreacted catalyst are contained in the polymer slurry depending upon the degree of polymerization, it is necessary to inhibit the polymerization reaction by some means. If the reaction is not inhibited, the polymerization proceeds further to induce abnormal increases in molecular weight, branching, and other objectionable results so that the desired polymer cannot be manufactured. When the redox catalyst comprising a reducing sulfoxy compound is employed, the polymer slurry will contain $H_2SO_3$. The inactivation of this $H_2SO_3$ completely prevents the polymerization in the recovery column which has heretofore induced troubles in the recovery of the monomer.

Thus, the redox catalyst system comprising a water-soluble reducing sulfoxy compound can be inactivated by raising the pH of the aqueous slurry of polymer and unreacted monomers to between 4 and 6 by the addition of an alkaline substance, such as the hydroxide, carbonate, or bicarbonate of an alkali metal or ammonia. However, with the rise in pH of the aqueous polymer slurry, the whiteness of the fibers obtained from such acrylonitrile polymer will tend to be reduced. A slight improvement in the whiteness of such fibers will greatly increase the commercial value of such fibers.

I have found that such improvement in the whiteness of the fibers produced from the acrylonitrile polymer recovered from an aqueous slurry thereof which had been so treated to prevent further polymerization of the monomeric materials therein by raising the pH to between 4 and 6 could be achieved by adjusting the pH of the polymer slurry to about 4 and below after or before recovering the unreacted monomers therefrom. Surprisingly, this reduction in pH does not reactivate the catalyst system and the object of preventing further polymerization of the monomeric material during the recovery step is achieved along with the improved whiteness of the acrylonitrile polymer fiber product. This reduction in pH to about 4 and below can be achieved by addition to the polymer slurry of an inorganic acid such as nitric acid, sulfuric acid, hydrochloric acid, or phosphoric acid.

This invention will be further described in detail by way of the following examples giving specific embodiments thereof. Percent and parts therein are by weight, unless otherwise noted.

EXAMPLE 1

Into a polymerization tank were fed 26.3 parts of a mixture of monomers consisting of 91% acrylonitrile and 9% methyl acrylate, 0.11 part of sodium methallyl sulfonate, 0.06 part of sodium chlorate, 1.38 parts of sodium sulfite, and 71.2 parts of pure water. The pH was adjusted with nitric acid to be 2.7 and the polymerization was carried out at 55° C. Then the pH was adjusted to be 4.5 by adding an aqueous solution of 1% caustic soda to stop the polymerization reaction by inactivating the catalyst system.

By this treatment, the unreacted catalyst was made inert and the concentration of the polymer in the aqueous polymer slurry after the polymerization had been stopped and the molecular weight of the polymer were kept constant and any after-polymerization was perfectly prevented.

When the unreacted monomers were recovered from this aqueous polymer slurry, the monomer did not polymerize during the recovery step and the operation did not have to be stopped as would have been the case had this treatment not been carried out.

Then sulfuric acid was added to the remaining aqueous polymer slurry so that the pH of the slurry might be reduced. The relationships between the pH's of the aqueous polymer slurry, the polymer, and the spinning solution made from such polymer, and the whiteness of the fibers when caustic soda had been added to the slurry so that the pH might be more than 4.5 followed, in certain cases, by reduction of pH with sulfuric acid were as shown in Table 1.

TABLE 1

| pH of the slurry | pH of the polymer | pH of the spinning solution | Whiteness of the fibers |
|---|---|---|---|
| 1.0 | 3.9 | 3.1 | 1.4 |
| 1.5 | 4.4 | 3.8 | 2.2 |
| 2.0 | 5.1 | 4.3 | 3.0 |
| 3.0 | 5.6 | 4.4 | 3.5 |
| 4.0 | 6.0 | 4.5 | 4.0 |
| 5.0 | 6.3 | 4.8 | 5.0 |
| 6.0 | 6.5 | 4.9 | 6.0 |

The pH or acidity of the polymer herein is a value obtained after the polymer had been separated by filtration from the aqueous polymer slurry which had had the pH adjusted, water in an amount more than 20 times as large had been sprinkled on the polymer several times at room temperature to wash the wet polymer free of the residues as of the acid and catalyst used for the polymerization and the acid and alkali used for the adjustment of the pH and the polymer then dispersed in distilled water (so that the concentration of the polymer slurry was 11%) and the pH of the dispersion was measured.

The whiteness of the fibers was measured by utilizing the rate of reflection of the fibers with a spectrophotoelectrometer Model EPV–2A made by Hitachi, Ltd. The larger the number, the higher the degree of coloring.

Table 1 shows that, by adding the alkaline substance to the aqueous polymer slurry after the polymerization, the polymerization was stopped (in such case, in order to make the stop of the polymerization effective, it was necessary to adjust the pH to be more than 4.0) but that, by adjusting the pH of the aqueous polymer slurry after the stop of the polymerization to be of a value lower than 4.0, the whiteness of the fibers was remarkably improved.

EXAMPLE 2

26 parts of a mixture of monomers consisting of 90% acrylonitrile and 10% methyl acrylate, 71 parts of water, 0.06 part of sodium chlorate, and 1.38 parts of sodium sulfite were continuously fed into a polymerizing vessel. The polymerization was carried out by adjusting the pH with nitric acid so as to be 2.7. An aqueous solution of 1% caustic soda was then continuously added to the overflowing aqueous polymer slurry so that the pH thereof might be adjusted to be 5.0.

By this treatment, the unreacted catalyst was made inert, the concentration of the polymer in the aqueous polymer slurry after the polymerization and the molecular weight of the polymer were kept constant, and afterpolymerization was completely prevented. When this treatment was not carried out, the molecular weight fluctuated and concentration of the polymer increased with passage of time.

The unreacted monomer was recovered from this thus treated aqueous polymer slurry. The monomer did not polymerize during the recovering step and the operation did not have to be stopped in contrast to the conditions occurring when this treatment was not carried out.

The pH of the polymer separated from the aqueous polymer slurry at a pH of 5.0 was 6.4. This polymer was dissolved to be of a concentration of 10% in an aqueous solution of 44% sodium thiocyanate. The whiteness of the fibers spun from this spinning solution was 5.0.

However, when the pH of the aqueous polymer slurry was adjusted to be 4.0 by adding nitric acid to the aqueous polymer slurry remaining after the unreacting monomer was recovered, the pH of the polymer separated from this aqueous polymer slurry was 6.0. This polymer was dissolved to be of a concentration of 10% in an aqueous solution of 44% sodium thiocyanate. The whiteness of the fibers spun from this spinning solution was so remarkably improved as to be 4.0.

EXAMPLE 3

26 parts of a mixture of monomers consisting of 90% acrylonitrile and 10% methyl methacrylate, 71 parts of water, 0.06 part of sodium chlorate, and 1.38 parts of sodium sulfite were continuously fed into a polymerizing vessel. The polymerization was carried out by adjusting the pH with nitric acid so as to be 2.7. An aqueous solution of 1% caustic soda was then added to the aqueous polymer slurry so that the pH might be adjusted to be 5.5.

By this treatment, the concentration of the polymer in the aqueous polymer slurry and the molecular weight of the polymer were kept constant and any after-polymerization was completely prevented.

The unreacted monomer was recovered from this aqueous polymer slurry. The monomer did not polymerize further during the recovery step and the operation did not have to be stopped.

The pH of the above treated polymer was 6.4. This polymer was dissolved to be of a concentration of 10% in an aqueous solution of 44% sodium thiocyanate. The whiteness of fibers spun from this spinning solution was 5.9. However, when the pH was adjusted to be 1.5 by adding sulfuric acid to the above treated aqueous polymer slurry, the pH of the polymer was 4.4, the pH of the spinning solution was 3.8 and the whiteness of the fibers was so remarkably improved as to be 22.

EXAMPLE 4

An aqueous solution of 1% caustic potash was added to an aqueous polymer slurry polymerized under the conditions of Example 3 so that the pH of the slurry might be adjusted to be 6.0.

By this treatment, the concentration of the polymer in the aqueous polymer slurry after the polymerization and the molecular weight of the polymer were kept constant and after polymerization was completely prevented.

Sulfuric acid was then added to this aqueous polymer slurry before the unreacted monomer was recovered from it so that the pH of the slurry was adjusted to 4.0. When the unreacted monomer was recovered from this aqueous polymer slurry, no trouble was seen.

When no sulfuric acid was added, the whiteness of the fibers obtained from the polymer was shown to be 6.0. However, the whiteness of the fibers obtained by adjusting the pH to 4.0 by adding sulfuric acid was so remarkably improved as to be 4.0. The difference was clearly seen even with the naked eye.

I claim:

1. In a method of recovering acrylonitrile polymer from an aqueous slurry thereof obtained upon polymerization of monomeric material comprising acrylonitrile in the presence of a redox catalyst system comprising a water-soluble reducing sulfoxy compound; the improvement comprising raising the pH of said slurry to between 4 and 6 prior to recovery of said monomers therefrom and then reducing the pH of a slurry of said polymer to about 4 and below.

2. A process as defined in claim 1 wherein the pH of said aqueous slurry of monomeric material and acrylonitrile polymer is raised to a pH of between 4 and 6 and then reduced to about 4 and below 2 prior to separation of monomeric material and polymer therefrom.

3. A process as defined in claim 1 wherein the pH of said aqueous slurry of monomeric material and acrylonitrile polymer is raised to between 4 and 6, monomeric material is evaporated therefrom, and then the pH of the remaining polymer slurry reduced to about 4 and below 3 prior to separation of said polymer therefrom.

4. A process as defined in claim 1 wherein the pH of said aqueous polymer slurry is raised with an alkaline substance and reduced with an inorganic acid.

5. A process as defined in claim 3 wherein said monomeric material is evaporated from said slurry by steam distillation.

6. A process as defined in claim 3 wherein said polymer is separated from said polymer slurry by filtration.

7. A process as defined in claim 1 wherein said polymer is then separated from the slurry and spun into fiber.

References Cited

UNITED STATES PATENTS 3,322,743  5/1967  Shibukawa et al

JOSEPH L. SCHOFER, *Primary Examiner.*

HARRY WONG, JR., *Assistant Examiner.*